(12) United States Patent  (10) Patent No.: US 7,539,785 B2
Kikuchi  (45) Date of Patent: May 26, 2009

(54) NETWORK DEVICE MANAGER

(75) Inventor: Koji Kikuchi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/169,632

(22) Filed: Jun. 30, 2005

(65) Prior Publication Data

US 2005/0237543 A1  Oct. 27, 2005

Related U.S. Application Data

(62) Division of application No. 09/793,915, filed on Feb. 28, 2001, now Pat. No. 6,947,154.

(30) Foreign Application Priority Data

Feb. 29, 2000  (JP) .............................. 2000-054084

(51) Int. Cl.
*G06F 3/01* (2006.01)
*G06F 15/177* (2006.01)
(52) U.S. Cl. ....................... 710/19; 715/736
(58) Field of Classification Search ................ 710/100, 710/105, 19; 715/734–739; 358/1.1
See application file for complete search history.

(56) References Cited

U.S. PATENT DOCUMENTS

| 5,764,911 | A |   | 6/1998  | Tezuka et al. ........... 395/200.53 |
| 5,796,951 | A | * | 8/1998  | Hamner et al. ............... 709/223 |
| 5,825,361 | A |   | 10/1998 | Rubin et al. ................. 345/349 |
| 6,034,970 | A | * | 3/2000  | Levac et al. .................. 370/466 |
| 6,310,692 | B1|   | 10/2001 | Fan et al. .................... 358/1.14 |
| 6,430,711 | B1| * | 8/2002  | Sekizawa ..................... 714/47 |
| 6,628,304 | B2| * | 9/2003  | Mitchell et al. ............. 715/734 |

OTHER PUBLICATIONS

V. Catania et al., "Monitoring Performance in Distributed Systems," Computer Communications 19 (1996) pp. 788-803.

* cited by examiner

*Primary Examiner*—Glenn A Auve
*Assistant Examiner*—Trisha Vu
(74) *Attorney, Agent, or Firm*—Fitzpatrick, Cella, Harper & Scinto

(57) ABSTRACT

Resource information and status information concerning devices connected to a network is acquired and the information is stored in memory. Icons that are capable of identifying the types of devices connected to the network based upon the stored resource information and status of utilization of the devices that is based upon the stored status information are displayed in combination on a display unit. In order to select (S504, S505, S506) either one or both of the resource information and status information and update this information, a device for which information is to be updated is specified from among the displayed icons. Both the resource information and status information, or whichever information has been selected, of the device that has been specified is acquired and the information in memory is updated (S507) based upon this information. Either or both of resource information and status information concerning a device designated on a network by a user can be acquired and the information can be updated.

10 Claims, 9 Drawing Sheets

< EXAMPLE OF STATUS-INFORMATION UPDATING MENU >

< EXAMPLE OF RESOURCE-INFORMATION UPDATING MENU >

NETWORK DEVICE MANAGER

CROSS REFERENCE TO RELATED APPLICATION

This application is a divisional of U.S. application Ser. No. 09/793,915, filed Feb. 28, 2001, the entire disclosure of which is incorporated herein by reference.

FIELD OF THE INVENTION

This invention relates to a data processing apparatus capable of communicating data with network-connected personal computers and various peripherals, a method of data processing using this apparatus, and a storage medium storing a computer-readable program for data processing.

BACKGROUND OF THE INVENTION

Computers and their peripherals such as printers, scanners and digital cameras have proliferated rapidly in recent years and so have networks such as LANs. There is also increasing need to share printers, modems and image readers over networks. Sharing peripherals such as printers and scanners over a network makes possible an environment in which a wide variety of devices can be used on a network.

When information concerning personal computers and peripherals is acquired and displayed, status information is acquired at the same time as resource information. As a consequence, acquiring the information takes time. In particular, since resource information for identifying such specifics as the type of a device and its capabilities often is much larger in quantity than status information that is for identifying the status of utilization of a device, acquiring the resource information is especially time consuming. For example, there are instances where, because of printer malfunction, the user wishes to acquire only information relating to the printer malfunction, and there are instances where the user wishes to enter an image and therefore desires only the latest status of scanner utilization (status information) concerning solely the scanners on a network in order to search for a scanner that is not presently in use. In such cases it is desirable to update only the particular device of interest and the desired information so that the user may acquire the necessary information more rapidly. However, the present state of the art is such that all available devices or all available items of information are acquired and presented to the user, as a result of which a great deal of time is needed to acquire the information that is desired. An attendant problem is that providing this information to the user places a heavy load upon the network.

Further, in a case where a shared peripheral has been connected locally to a personal computer on a network, the information acquired from this peripheral is of two kinds, namely first information held by the driver program running on the personal computer and second information held by the peripheral. If the second information of the peripheral is to be acquired, therefore, it is required that this be performed via the program of the personal computer to which the peripheral has been connected. As a consequence, acquiring this information takes longer than acquiring the first information.

Thus, the time needed to acquire information from a shared peripheral is long or short depending upon the information to be acquired. The problem which arises is that information cannot be acquired efficiently.

SUMMARY OF THE INVENTION

The present invention is proposed to solve the foregoing problems of the prior art and its object is to provide a data processing apparatus and method in which the user designates a desired device of interest (e.g., a personal computer, a peripheral or a group comprising a personal computer and peripherals) and specifies information to be acquired concerning the device, thereby making it possible to ascertain more rapidly only information of interest concerning a device of interest needed by the user, as a result of which operating efficiency is improved and network load alleviated.

According to the present invention, the foregoing object is attained by providing a data processing apparatus capable of communicating data with devices connected to a network, comprising: acquisition-means for acquiring resource information and status information concerning the devices connected to the network; storage means for storing the acquired information in memory; display control means for displaying, in combination on a display unit, icons that are capable of identifying the types of devices connected to the network based upon the stored resource information, and status of utilization of the devices based upon the stored status information; and specifying means for specifying, from the display of icons, a device to be updated in order to select and update either one or both of the resource information and status information; the acquisition means acquiring both the resource information and status information, or whichever information has been selected, of the device that has been specified, and the storage means updating the information in memory based upon the information that has been acquired.

The data processing apparatus preferably further comprises hierarchical management means for hierarchically managing organization of devices connected to the network.

The hierarchical management means performs management on a per-layer basis, wherein the layers are a first layer comprising peripherals connected to personal computers, a second layer comprising the personal computers and a third layer comprising workgroups each of which is constituted by a group of the personal computers.

Preferably, the specifying means specifies the devices individually as devices for which information is to be updated or specifies devices, which are contained in a layer managed by the hierarchical management means on a per-layer basis, collectively as devices for which information is to be updated.

Preferably, if the third layer has been designated, the specifying means specifies, as devices for which information is to be updated, those personal computers constituting the second layer that belong to the third layer and those peripherals belonging to the first layer that are connected to these personal computers.

Preferably, the specifying means specifies, as devices for which information is to be updated, a device that belongs to a designated layer and a device that belongs to a layer subordinate to this layer.

Preferably, the data processing apparatus further comprises limiting means for limiting types of devices, wherein the limiting means limits types of devices from devices specified by the specifying means as devices for which information is to be updated.

Preferably, the devices include any of printers, facsimile machines and scanners.

Further, the foregoing object is attained by providing a data processing method comprising: an acquisition step of acquiring resource information and status information concerning devices connected to a network; a storage step of storing the acquired information in memory; a display control step of displaying, in combination on a display unit, icons that are capable of identifying the types of devices connected to the network based upon the stored resource information, and status of utilization of the devices based upon the stored status information; and a specifying step of specifying, from the display of icons, a device to be updated in order to select and update either one or both of the resource information and status information; the acquisition step acquiring both the resource information and status information, or whichever information has been selected, of the device that has been specified, and the storage means updating the information in memory based upon the information that has been acquired.

The data processing method preferably further comprises a hierarchical management step of hierarchically managing organization of devices connected to the network.

The hierarchical management step performs management on a per-layer basis, wherein the layers are a first layer comprising peripherals connected to personal computers, a second layer comprising the personal computers, and a third layer comprising workgroups each of which is constituted by a group of the personal computers.

Preferably, the specifying step specifies the devices individually as devices for which information is to be updated or specifies devices, which are contained in a layer managed by the hierarchical management step on a per-layer basis, collectively as devices for which information is to be updated.

Preferably, if the third layer has been designated, the specifying method specifies, as devices for which information is to be updated, those personal computers constituting the second layer that belong to the third layer and those peripherals belonging to the first layer that are connected to these personal computers.

Preferably, the specifying step specifies, as devices for which information is to be updated, a device that belongs to a designated layer and a device that belongs to a layer subordinate to this layer.

Preferably, the data processing method further comprises a limiting step of limiting types of devices, wherein the limiting step limits types of devices from devices specified by the specifying step as devices for which information is to be updated.

Further, the present invention further provides a computer-readable storage medium storing program modules for computer implementation of a data updating method relating to devices connected to a network, the program modules being: an acquisition module for acquiring resource information and status information concerning devices connected to a network; a storage module for storing the acquired information in memory; a display control module for displaying, in combination on a display unit, icons that are capable of identifying the types of devices connected to the network based upon the stored resource information, and status of utilization of the devices based upon the stored status information; and a specifying module for specifying, from the display of icons, a device to be updated in order to select and update either one or both of the resource information and status information; the acquisition module executing processing for acquiring both the resource information and status information, or whichever information has been selected, of the device that has been specified, and the storage module executing processing for updating the information in memory based upon the information that has been acquired.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENTS

Preferred embodiments of the present invention will now be described in detail in accordance with the accompanying drawings.

First Embodiment

<Description of Apparatus>

Figure 1:
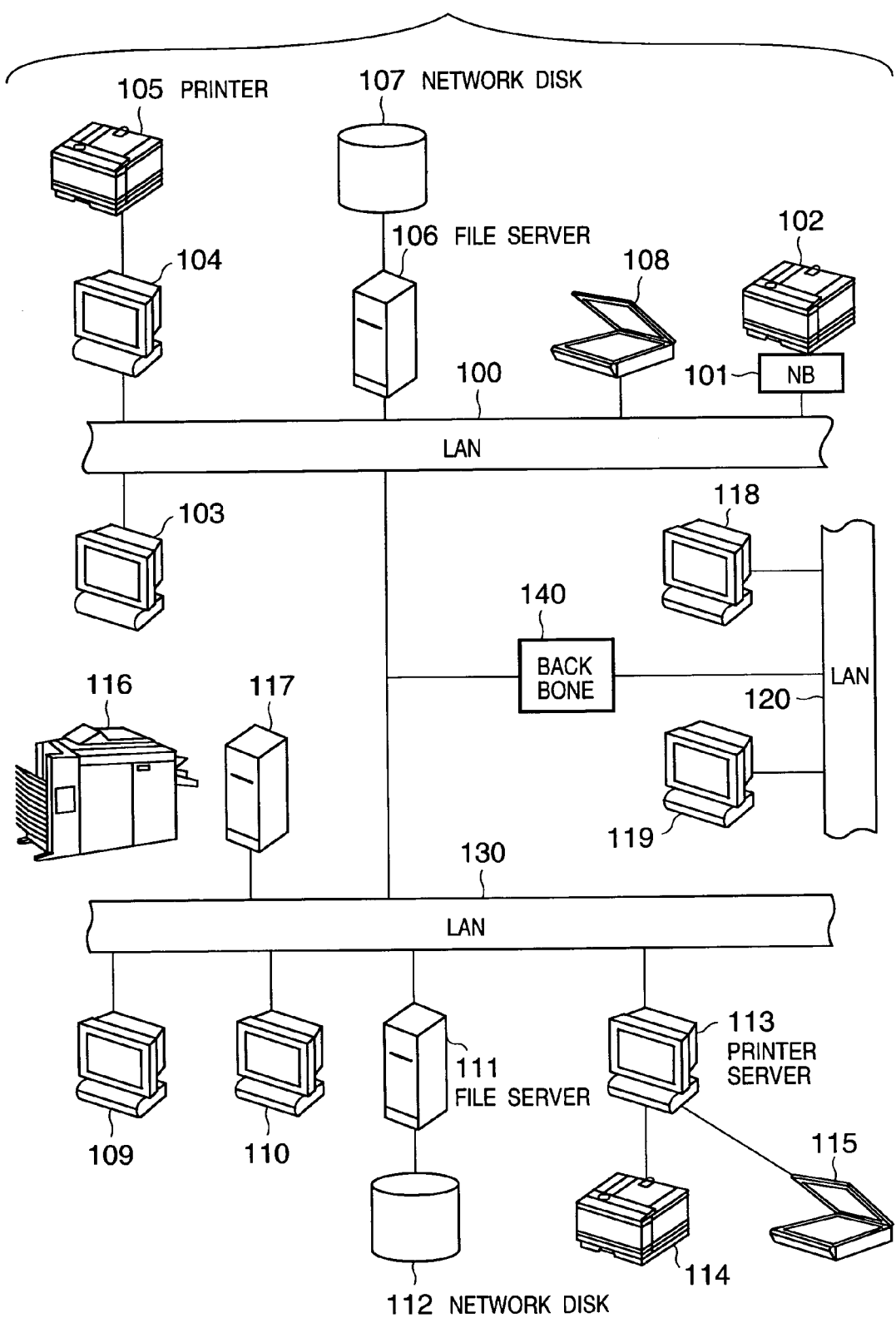
FIG. 1 is a diagram useful in describing the configuration of a system to which an information processing apparatus according to a first embodiment of the present invention is applied.

FIG. 1 is a diagram useful in describing the system configuration of network devices inclusive of a data processing apparatus according to the present invention. As shown in FIG. 1, a printer 102, which has an open architecture, is connected to a network via a network board (NB) 101. The network board 101 is connected to local area networks (LAN) 100, 120 and 130 via a LAN interface such as an Ethernet interface 10Base-2 having a coaxial connector or a 10Base-T having an RJ-45, etc.

A plurality of personal computers 103, 104, 109, 110, etc., also are connected to the LANs 100, 130 and are capable of communicating with the network board 101 under the control of a network operating system. Accordingly, one of the personal computers, say personal computer 103, can be used as a personal computer for management of network devices. Further, a printer 105 may be locally connected to the personal computer 104 as a local printer.

Further, a personal computer 106 functioning as a file server is connected to the LAN 100 and manages access to files that have been stored in a large-capacity network disk 107.

The personal computer 104, which functions as a printer server, manages printing performed by the locally connected printer 105 or printing performed by a remote printer 102. Similarly, a personal computer 113, which functions as a printer server, manages printing performed by a locally connected printer 116 or printing performed by the remote printer 102.

Furthermore, a personal computer 115 is made to function as a scanner server and is capable of managing scanners such as a scanner 115 connected locally or a remote scanner 108. The scanner 108 is connected to the LAN 100 via a network board. A digital copier 116 provides printer and scanner functions under the management and control of an imaging processing unit 119.

The network shown in FIG. 1 is capable of using network software such as Novell or UNIX software in order that various network members may communicate with one another efficiently. For example, NetWare (a registered trademark of Novell), which is network software developed by Novell, can be used. For a detailed description of this software package, refer to the online documentation bundled with the NetWare package. (This can be purchased from Novell together with the NetWare package.)

Thus, in the first embodiment, in order to perform an operation for designating the updating of information of a peripheral device, separate menu items are provided for a command to update status information and for a command to update resource information of a peripheral device.

As a result, when the user of a computer terminal on the network is to acquire information from a plurality of peripherals on the network, the user can issue an information acquisition command that conforms to the kind of information that is to be acquired. As a consequence, the desired information can be acquired more quickly and the traffic load on the network can be suppressed.

Further, according to the first embodiment, an example is described in which a command for updating status information and a command for updating resource information are each provided. However, an example of application described below also is covered by the scope of the present invention.

If a peripheral on a network has been connected locally to a network computer (referred to as a "host personal computer" below), the information acquired from this peripheral is of two kinds, namely first information held by the driver program running on the host personal computer and second information held by the peripheral.

Accordingly, a command for updating the first information and a command for updating the second information may be provided as separate menu items.

In order to achieve this, it is required that the computer (referred to as the "user personal computer" below) requesting information concerning a peripheral store beforehand information for identifying whether the information to be acquired is held on the side of the host personal computer or on the side of the peripheral. To accomplish this, it will suffice to store table information in the user personal computer, wherein the table information indicates, for each item of information that can be acquired, whether the information is held on the side of the host personal computer or on the side of the peripheral.

If the user personal computer issues a command to update the first information, reference is had to the table, only information held on the side of the host personal computer is selected, and a command to acquire only the selected information is generated and this command is transmitted to the host personal computer on the network.

If the user personal computer issues a command to update the second information, reference is had to the table, only information held on the side of the peripheral is selected, and a command to acquire only the selected information is generated and this command is transmitted to a plurality of host personal computers on the network.

The host personal computer analyzes the command from the user personal computer. If the command is for information held by the host personal computer, the latter generates the response information based upon this held information and transmits the response information to the user personal computer. If the command is for information held on the side of the peripheral device, the host personal computer generates the response information by acquiring information from the peripheral device and transmits the response information to the user personal computer.

The personal computers 103 and 104 are ordinary personal computers which can generate data files and transmit the generated data files to the LAN 100 or which can receive data files from the LAN 100 and display and/or process these files. It should be noted that although personal computers are shown in FIG. 1, other types of computers suitable for the execution of network software may be included in the network. For example, in a case where UNIX software is being employed, UNIX workstations may be connected to the network and these workstations can be used together with the illustrated personal computers.

The LAN 100 ordinarily provides service to comparatively local user groups such as user groups on one or several successive floors in one building.

As users become separated from one another, as when users are present in different buildings or in different prefectures, a wide-area network (WAN) may be constructed to interconnect them.

A WAN basically is an aggregate of LANs formed by interconnecting several LANs by a high-speed digital line such as a high-speed Integrated Services Digital Network (ISDN) telephone line. For example, as shown in FIG. 1, a WAN is formed by interconnecting the LAN 100 and the LAN 120 by a backbone 140.

The devices that have been connected to each of the LANs 100, 120 and 130 are capable of gaining access to the functions of the devices connected to the other LANs via the WAN connection.

Figure 2:
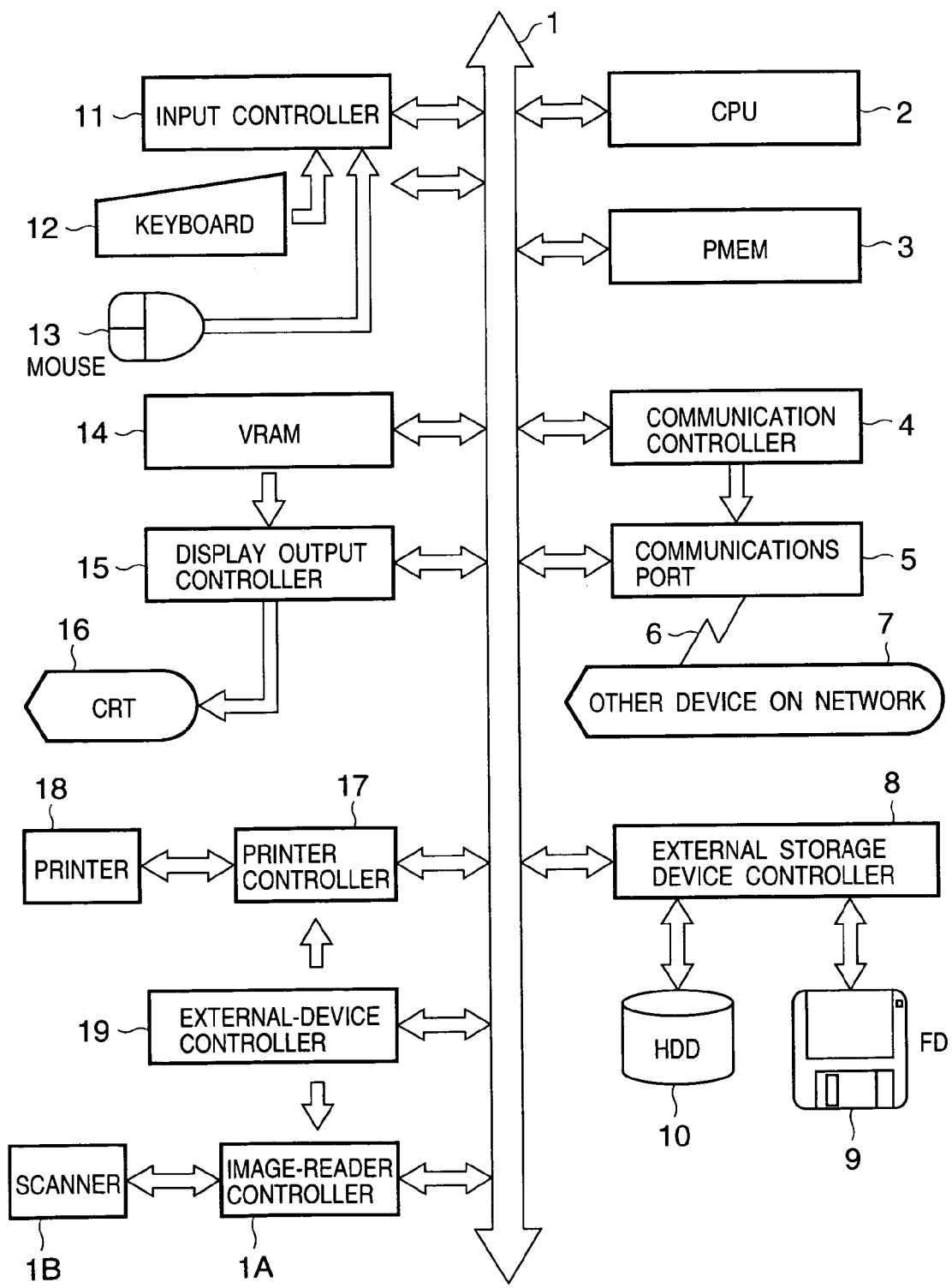
FIG. 2 is a block diagram useful in describing the construction of an information processing apparatus according to the first embodiment of the present invention.

FIG. 2 is a block diagram useful in describing the construction of a client illustrative of this embodiment. It is assumed here that certain devices (inclusive of a printer, scanner, modem and multifunction image processing unit, etc.) are arranged so as to be capable of communicating by a predetermined protocol with other locally connected data processing devices via a communication medium (not shown), e.g., a LAN such as Ethernet.

As shown in FIG. 2, a system bus 1 connects various blocks, described below. A CPU (central processing unit) 2 controls the overall apparatus. A program memory (PMEM) 3 selects and reads in a program, which is for executing the present processing, from a hard disk 10. The program is executed by the CPU 2.

Data that has been entered from a keyboard 12 is stored as code information in the PMEM 3, which serves also as a text memory.

A communication controller 4 controls input/output data at a communication port 5. A signal output from the communication port 5 is transmitted via a communication line 6 to a communication port of another device 7 on the network. Exchange of data among printers and image readers (scanners) shared over the network is carried out via the communication controller 4. Though the description in this embodiment relates to a network such as a LAN, it goes without saying that the present invention is applicable even if the communication port and communication line connected to the communication controller 4 are constituted by an ordinary public telephone line.

An external storage device controller 8 controls access to data-file disks, e.g., a floppy disk (FD) 9 and a hard disk (HD) 10.

An input controller 11 has input units such as the keyboard 12 and a mouse 13 connected thereto. The operator operates the system by operating the keyboard 12. A pointing device (PD) is used to manipulate image information on a CRT 16. In this embodiment, the mouse 13 is used as the pointing device. By moving a cursor at will along the X and Y directions on the CRT 16, the operator selects command icons on a command menu to thereby designate processing, designate editing objects and designate plot positions, etc.

A video image memory (VRAM) 14 stores rendering data (bitmap data) expanded for display by the CRT 16. The content of the VRAM 14 is read out when appropriate via the display output controller 15 and is displayed on the CRT 16.

A printer controller 17 controls the output of data to a connected printer 18.

An image-reader controller 1A controls the image reading operation of a connected image reader 1B. An external-device controller 19 controls the printer controller 17 or the operation of an external device via the image-reader controller 1A.

The above-mentioned image-reader controller 1A and image reader 1B are essential components in the image reading server according to this invention. However, in case of an apparatus on the client side, the identical shared components on the server side can be used via the communication controller 2404 and communication port 5, as set forth above.

In the present embodiment, the program that has been stored in the ROM may be stored also on a storage medium such as the hard disk (HD) 10 or floppy disk (FD) 9 connected directly to the apparatus. Furthermore, the program may be stored in another device constructed on the network. The program according to the present invention can be supplied to a system or apparatus via the storage medium, such as the hard disk 10 or floppy disk 9, or via the network.

<Acquisition and Display of Resource Information and Status Information>

Described next will be display of icons performed using resource information and status information concerning various personal computers and peripheral equipment.

Here "resource information" shall be taken to mean information for identifying device specifics such as device type and capability, and "status information" shall be taken to mean information for identifying device utilization status.

Figure 3:
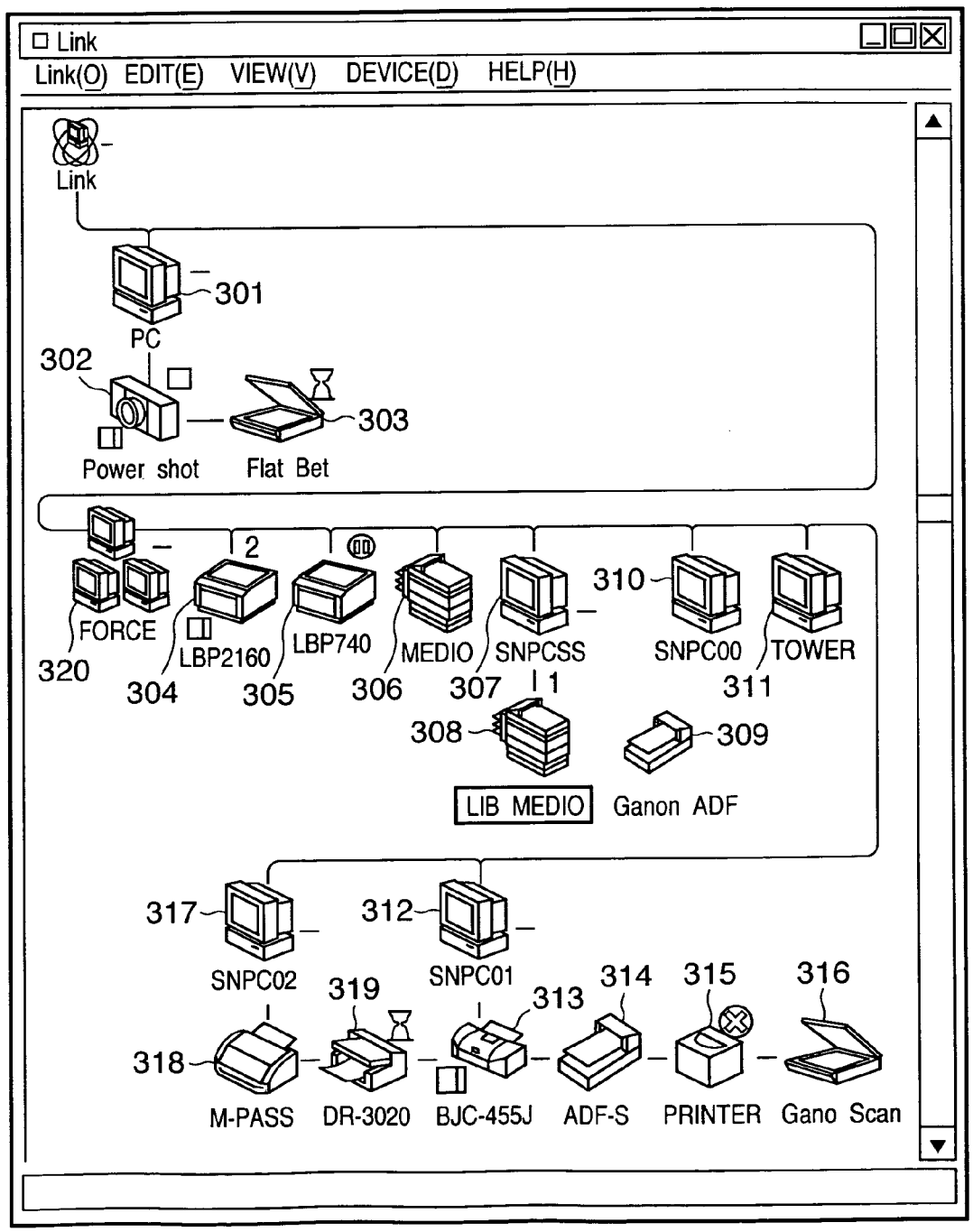
FIG. 3 is a diagram useful in describing an example of display of the organization of devices connected to a network displayed on a CRT.

FIG. 3 is a diagram useful in describing first network components displayed on the CRT 16 shown in FIG. 2. According to this embodiment, the shapes of icons of peripherals are displayed with enhanced features in the manner illustrated so that the personal computers and peripherals present on the network may be distinguished more easily. Icons 301, 307, 310, 311, 317 and 312 are icons indicative of personal computers, icons 304, 305, 306, 308, 313, 315 and 318 are icons indicative of printer functions, icons 303, 309, 314, 316 and 319 are icons indicative of scanner functions, and an icon 302 is an icon indicative of digital camera function.

Among the icons representing the printer functions, icons 304 and 305 are displayed using icons that represent the form of a laser printer; icons 306 and 308 using icons that represent the form of multifunction printer; icon 313 using an icon that represents the form of a bubble-jet printer; icon 315 using an icon that represents the form of an ordinary printer; and icon 318 using an icon that represents the form of an MF printer.

Similarly, among the icons representing image input devices (scanners and a digital camera), icon 302 is displayed as an icon that represents the form of a digital camera; icon 303 as an icon that represents the form of an ordinary flat-bed scanner; icon 309 as an icon that represents the form of an ADF scanner manufactured by Canon; icon 314 as an icon that represents the form of an ordinary ADF scanner; icon 316 as an icon that represents the form of a flat-bed scanner manufactured by Canon; and icon 318 as an icon that represents the form of a document scanner manufactured by Canon.

These icons are displayed upon determining the type of each peripheral device using resource information acquired from each peripheral device.

Further, topology-type information indicative of personal computers to which printers are connected and of direct network connections is displayed using resource information. However, since these items of resource information are seldom changed, they constitute information the constant monitoring of which is deemed unnecessary.

The numerals displayed at the upper right of the icons 304 and 308 display status information indicating the number of jobs currently awaiting printing by the particular printer. Similarly, the hourglass marks at the upper right of the icons 303 and 319 display status information indicating that these scanners are currently in use. Further, the mark at the upper right of icon 305 displays status information indicating that this printer is in a temporarily halted state, and the mark at the upper right of icon 315 displays status information indicating that this printer is malfunctioning.

Status information is information for detecting peripheral devices utilizable within limits desired by the user when a peripheral device is to be utilized by the user, and for verifying whether a peripheral device that has executed processing is operating normally. Accordingly, unlike resource information, status information is that which requires the acquisition and display of the latest information possible.

Acquiring "resource information", which is information construed to change very little, and "status information", which is information considered to change constantly, always at the same time is not very efficient. A feature of the present invention is to provide means for acquiring these two types of information separately of each other and to update and display only the information acquired.

Described next will be a method of acquiring resource information or status information individually from designated personal computers and peripherals.

<Method of Acquiring Resource Information or Status Information from Personal Computers, Workgroups and Peripherals>

Figure 4:
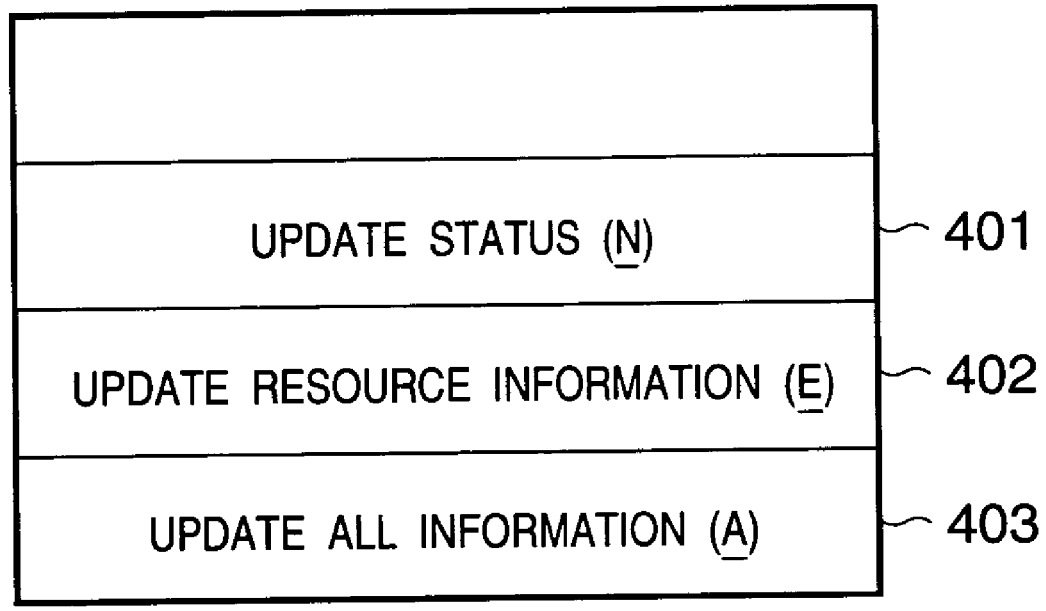
FIG. 4 is a diagram illustrating example of display of an information selection menu according to the first embodiment.

As for methods of designating personal computers and peripherals, an icon being displayed may be designated using a pointing device such as a mouse or by using a keyboard. Here the methods are not particularly limited so long as the desired personal computer or peripheral can be designated. Information concerning designated personal computers and peripherals can be updated by providing designation means such as the menu shown in FIG. 4 by way of example. Processing for updating status information is designated by selecting menu item 401, processing for updating resource information is designated by selecting menu item 402, and processing for updating all information is designated by selecting menu item 403. It goes without saying that the invention is not limited to this designation means. As long as status information and resource information can be designated so as to be acquired individually, other types of operations such as a keyboard operation will suffice.

It is possible to update only information that is necessary by providing means for designating personal computers and peripherals and means for designating information that is to be acquired.

Figure 5:
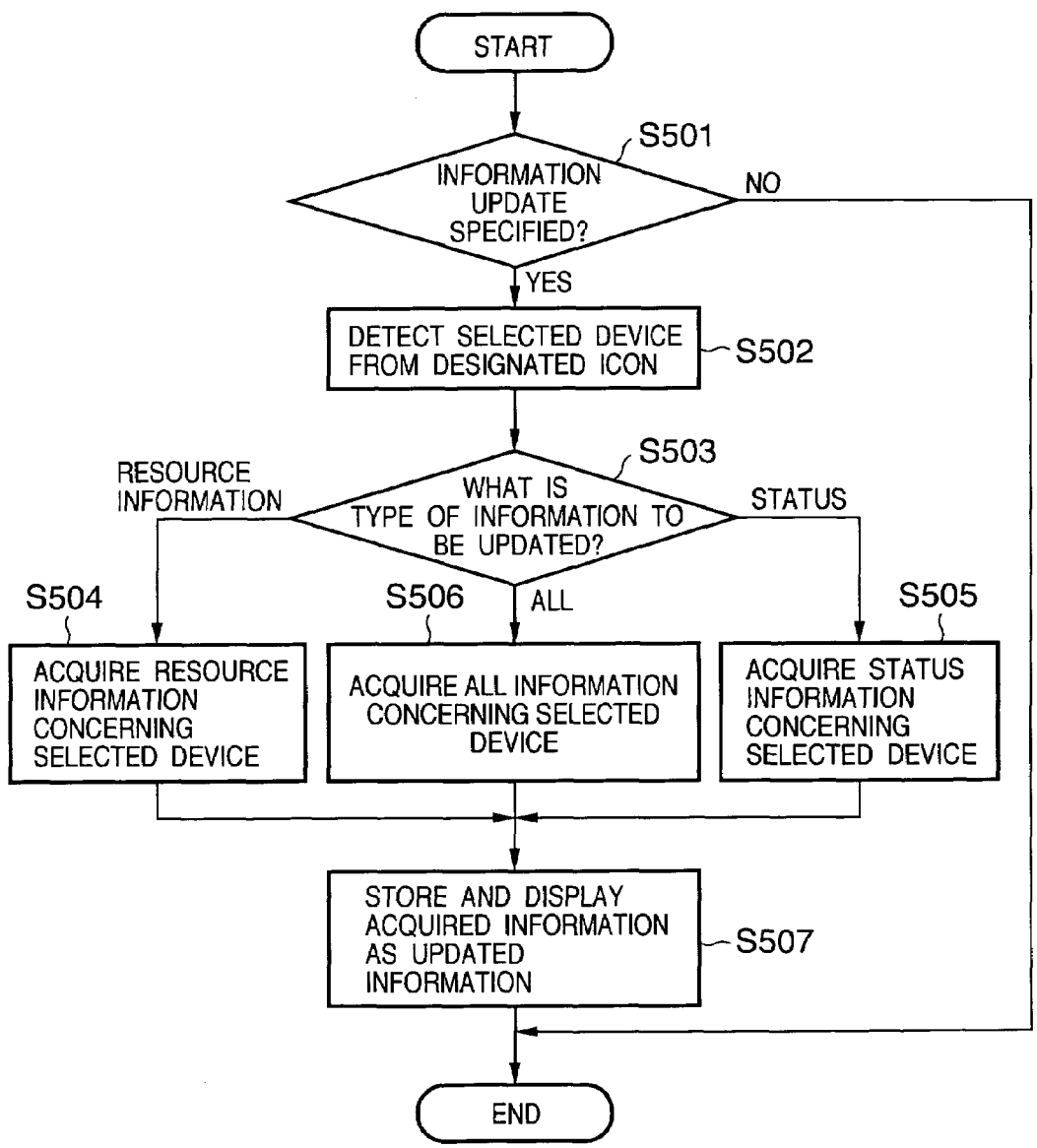
FIG. 5 is a flowchart useful in describing processing according to the first embodiment.

Reference will be had to the flowchart of FIG. 5 to describe processing for designating personal computers and peripherals and for designating information to be acquired. The flowchart illustrates a control program relating to designation of personal computers and peripherals and designation of information desired to be acquired according to this embodiment. Processing is executed by the CPU 2 based upon the program stored on the hard disk 10 shown in FIG. 2 or on a storage medium that is not shown.

Step S501 in FIG. 5 calls for a decision as to whether or not information update processing has been specified. If such processing has been specified ("YES" at step S501), control proceeds to step S502. If such processing has not been specified ("NO" at step S501), the processing of this flowchart is exited.

The personal computer or peripheral for which information update has been specified is determined at step S502 by acquiring the specified icon information. That is, information relating to the currently selected personal computer or peripheral device is acquired.

Control then proceeds to step S503. Here the type of information update specified is determined. If processing for updating only resource information has been specified, then processing for acquiring resource information is executed with regard to the designated personal computer or peripheral of interest at step S504. If updating solely of status has been designated, on the other hand, then processing for acquiring status information is executed with regard to the personal computer or peripheral at step S505. If processing for updating both status information and resource information has been designated, then processing for acquiring all information is executed with regard to the designated personal computer or peripheral of interest in the conventional manner.

Already stored information that is relevant is updated at step S507 based upon the information acquired at step S504, S505 or S506, and a display that reflects this updated information is presented. The display controller 15 presents the display on the CRT 16 based upon the updated information.

In accordance with the embodiment as described above, a personal computer or peripheral device connected to a network is designated to acquire only the desired information, the acquired information is updated and stored in memory and a display can be presented based upon this information. As a result, the user can acquire the desired information more quickly and the load upon the network can be alleviated.

Second Embodiment

According to the method of the first embodiment, status information or resource information is acquired separately by designating personal computers or peripherals one at a time. According to the method of this embodiment, if a personal computer or peripheral for which updating of information is desired is designated, processing is executed on a group-by-group basis. This eliminates the labor involved in designating network devices individually and allows groups of devices to be designated more efficiently. This embodiment is such that even when a newly registered peripheral (a peripheral that has been added on anew) is detected, the personal computer to which this peripheral is connected is designated to update information on a per-group basis, thereby making it possible to detect the information concerning the newly registered peripheral as well without acquiring all available information.

The method of designating a personal computer or peripheral according to this embodiment is as follows: If a personal computer has been designated, the peripherals connected to this personal computer become selected as a group. If a workgroup has been designated, each personal computer belonging to this group and the peripherals connected to each of these personal computers become selected for the purpose of information update.

The network configuration of this embodiment is similar to that of FIG. 1 and the construction of the data processing apparatus is similar to that of FIG. 2.

Figure 6:
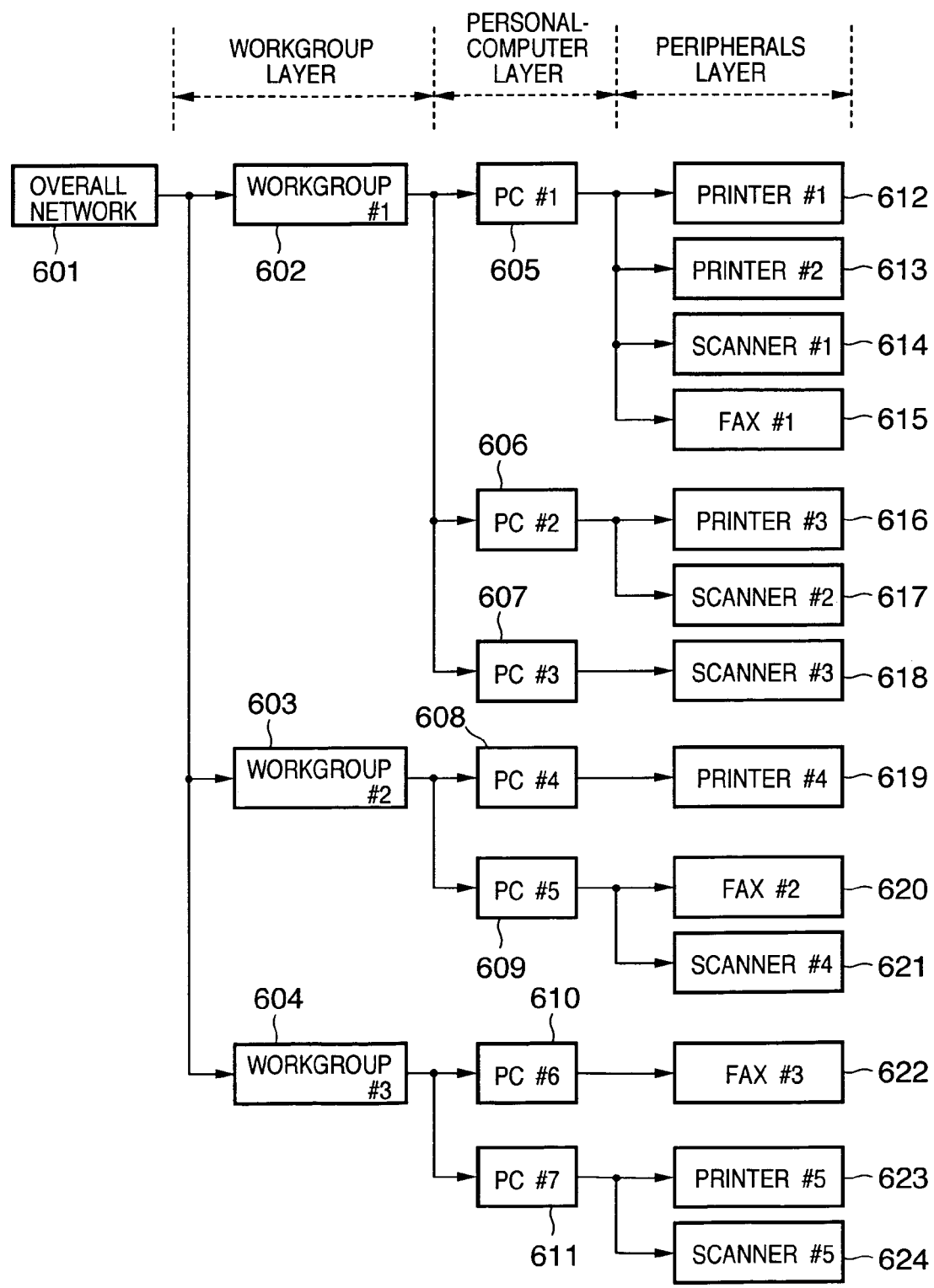
FIG. 6 is a diagram useful in describing the concept of a group according to a second embodiment.

FIG. 6 is a diagram useful in describing group processing used as a method of designating personal computers and peripherals in the second embodiment. The overall network in FIG. 6 is indicated at 601.

A workgroup layer, a personal-computer layer and a peripherals layer are organized hierarchically under the network 601. The workgroup layer includes workgroups 602, 603 and 604. Thus the personal computers on the network are grouped for managing licensing and access privilege, etc. The personal-computer layer has personal computers 605, 606 and 607 which, in this case, belong to the workgroup 602 (workgroup #1), personal computers 608 and 609 which belong to the workgroup 603 (workgroup #2), and personal computers 610 and 611 which belong to the workgroup 604 (workgroup #3).

Peripherals 612, 613, 614 and 615 are connected to the personal computer 605 (PC #1), peripherals 616 and 617 are connected to the personal computer 606 (PC #2), peripheral 618 is connected to the personal computer 607 (PC #3), peripheral 619 is connected to the personal computer 608 (PC #4), peripherals 620 and 621 are connected to the personal computer 609 (PC #5), peripheral 622 is connected to the personal computer 610 (PC #6), and peripherals 623 and 624 are connected to the personal computer 611 (PC #7).

In a case where personal computer 605 (PC #1) has been designated as a device for information acquisition in FIG. 6, the personal computer 605 and the five peripherals connected to it, namely a printer #1 which is peripheral 612, a printer #2 which is peripheral 613, a scanner #1 which is peripheral 614 and a facsimile machine #1 which is peripheral 615, become selected as devices for information acquisition. A designated device and the peripherals connected to this device are bundled together as a selection. Thus the approach to processing taken in this embodiment when a personal computer has been designated as a device for information acquisition is that the personal computer and its peripherals included in the scope of selection are decided upon as devices of interest.

In a case where workgroup 603 (workgroup #2) has been designated as an object for which information is to be acquired, the two personal computers 608 (PC #4) and 609 (PC #5) that belong to this workgroup and the three peripherals connected to these personal computers, namely a printer #4 which is peripheral 619, a facsimile machine #2 which is peripheral 620 and a scanner #4 which is peripheral 621, for a total of five devices, become selected as devices for which information is to be acquired. Thus when a workgroup has been designated as an object for which information is to be acquired, the personal computers and peripherals included in this scope of selection are decided upon as devices of interest.

Group processing according to the second embodiment will be described with reference to the flowchart of FIG. 7.

Figure 7:
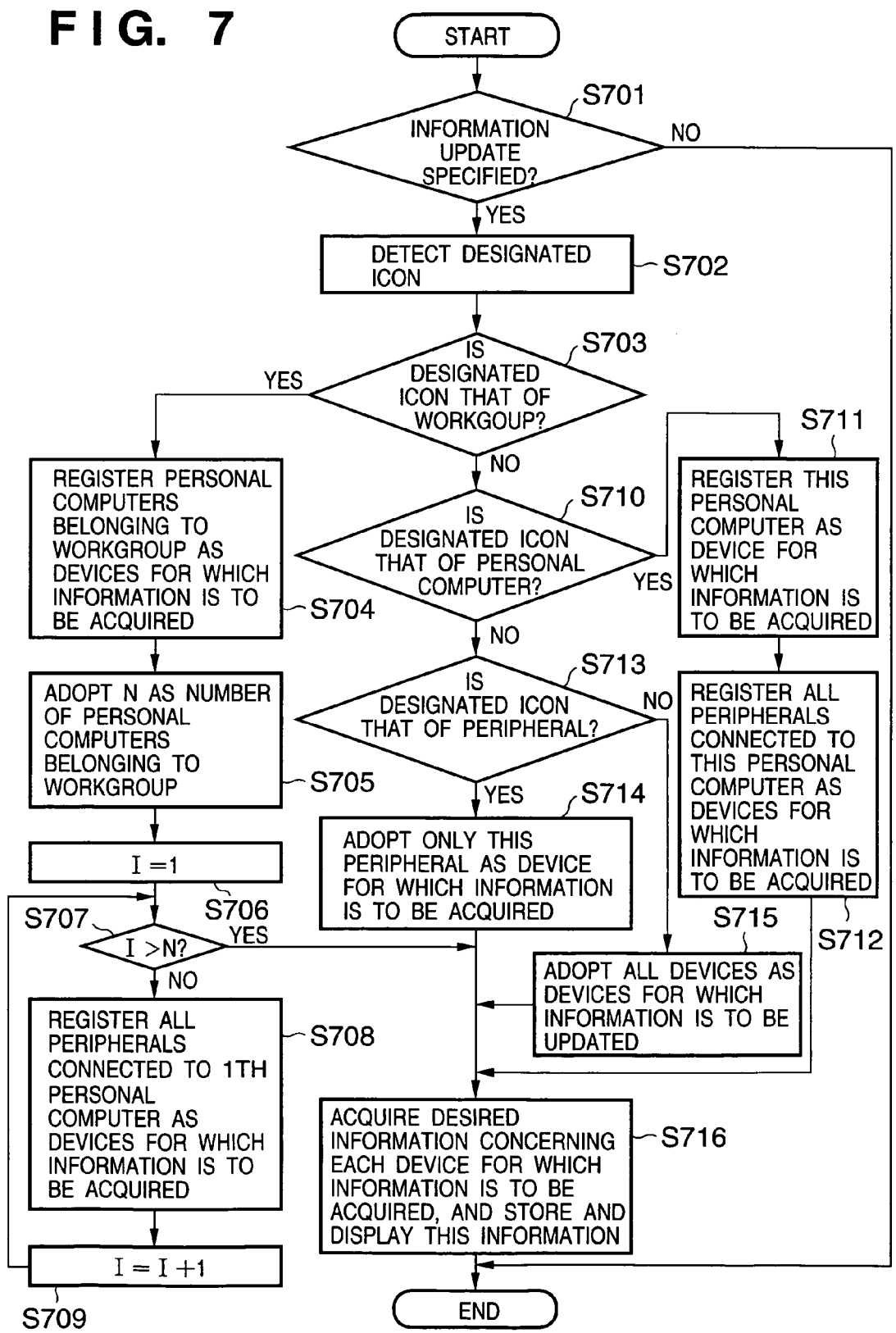
FIG. 7 is a flowchart useful in describing processing according to the second embodiment.

Step S701 in FIG. 7 calls for a decision as to whether or not information update processing has been specified. If such processing has been specified ("YES" at step S701), control proceeds to step S502. If such processing has not been specified ("NO" at step S701), the processing of this flowchart is exited.

The designated icon is detected at step S702 to determine the designated personal computer, workgroup or peripheral. This is followed by step S703, at which it is determined whether the designated icon is that of a workgroup. If the designated icon is that of a workgroup ("YES" at step S703), control proceeds to step S704. Here all personal computers belonging to this workgroup are registered as devices for which information is to be acquired. Next, the total number "N" of personal computers belonging to this workgroup is acquired at step S705. A counter variable I is initialized to 1 at step S706. The counter variable I and the number N of personal computers are compared at step S707. If I is equal to or less than N (I$\leq$N), control proceeds to step S708.

The peripherals connected to an Ith personal computer are acquired and all of these are registered at step S708 as devices for which information is to be acquired at this time. This is followed by step S709, at which the counter variable I is incremented to adopt the next personal computer as the personal computer of interest. Control then returns to step S707. When processing regarding all personal computers ends, control proceeds to step S716.

If it is found at step S703 that the designated icon is not that of a workgroup, then control proceeds to step S710 to determine whether the designated icon is that of a personal computer. If the designated icon is that of a personal computer ("YES" at step S710), control proceeds to step S711. Here the personal computer is registered as a device for which information is to be acquired. This is followed by step S712, at which all of the peripherals connected to this designated personal computer are registered as devices for which information is to be acquired. Control then proceeds to step S716.

If it is found at step S710 that the designated icon is not that of a personal computer ("NO" at step S710), control proceeds to step S713, at which it is determined whether the designated icon is that of a peripheral. If the answer is "YES", then control proceeds to step S714 and this peripheral is adopted as a device for which information is to be acquired.

If it is found that the designated icon is not that of a peripheral ("NO" at step S713), then control proceeds to step S715, where all personal computers and peripherals on the network are adopted as devices for which information is to be acquired. When the processing of steps S714 and S715 ends, control proceeds to step S716.

Step S716 is processing for the acquisition of information regarding all personal computers and peripherals adopted thus far as devices for which information is to be acquired, and for storing and displaying the acquired information as updated information. As in the first embodiment, status information and resource information may be acquired separately or a selection can be made to acquire all of these items of information.

More specifically, the processing for acquiring, storing and displaying information indicated at step S716 can be realized by executing the processing of the flowchart of FIG. 5 successively for all personal computers and peripherals adopted as target devices to which the processing of the first embodiment is applied.

Thus, in accordance with this embodiment as described above, when only information desired to be updated is acquired, stored and displayed upon designating personal computers and peripherals, it is possible to employ group processing as the method of designation. Specifically, in a case where a workgroup has been designated, the personal computers belonging to this workgroup and the peripherals connected to these personal computers are adopted as devices for which information is to be acquired. In a case where a personal computer has been designated, the personal computer and the peripherals connected to this personal computer are adopted as devices for which information is to be acquired. Merely designating a personal computer makes it possible to acquire information concerning peripherals newly connected to this personal computer without updating all information. This makes it possible reduce the load upon the network.

Third Embodiment

According to the processing of the second embodiment, information is acquired upon designating a group of personal computers or peripherals by designating a workgroup. According to a method of updating information according to a third embodiment of the present invention, means for designating the type of network device is provided and, when status information or resource information is acquired in regard to designation of a group according to the second embodiment, information is updated only in connection with a device of a designated type contained in the group.

Figure 8A:
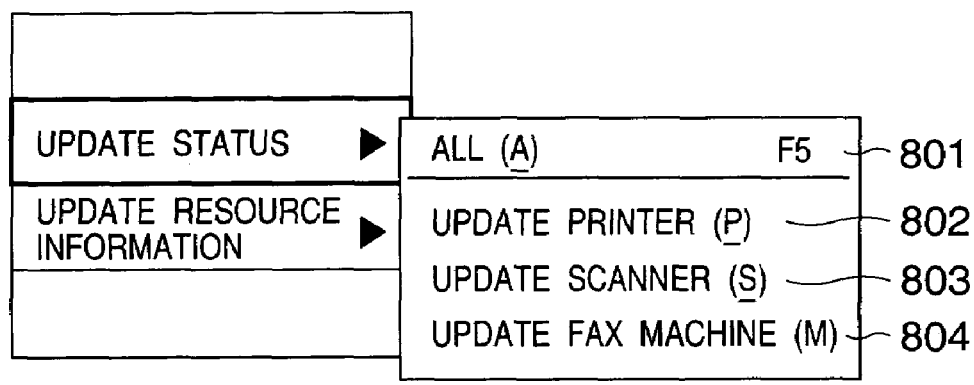
FIG. 8A is a diagram illustrating an example of display of a status-information selection window according to a third embodiment.
Figure 8B:
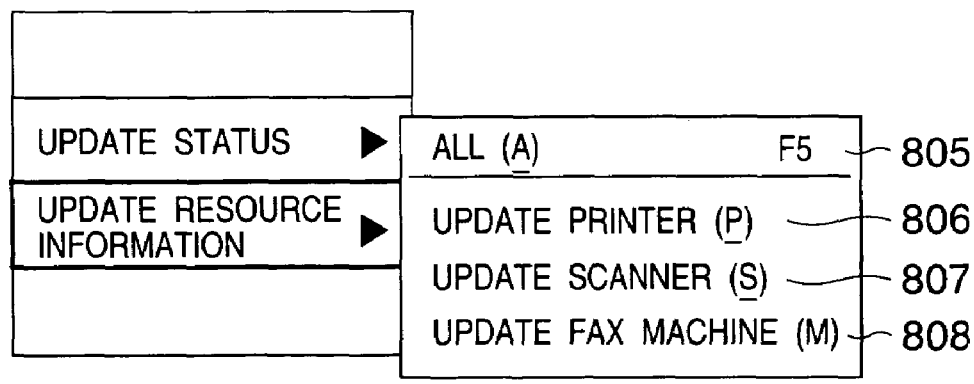
FIG. 8B is a diagram illustrating an example of display of a resource-information selection window according to the third embodiment.

FIGS. 8A and 8B illustrate examples of menus for designating the type of peripheral. FIG. 8A is a menu for selecting the entire range of selections (ALL), only a scanner, only a printer or only a facsimile machine when status is updated. Similarly, FIG. 8B is a menu that makes possible the same selections when resource information is updated. These menus are examples only and do not limit the types of peripheral devices.

An example of processing will be described with reference to FIG. 6 illustrating the hierarchical structure of devices employed in the foregoing embodiment. For example, assume that personal computer 605 has been selected and that only the printers have been designated by status update processing in accordance with menu item 802 in FIG. 8A. Under this assumption, the printers contained in the group obtained by selection of the personal computer 605 (PC #1) become the devices for which updating of information is desired. That is, status information concerning only the printers 612 (printer #1) and 613 (printer #2) is updated. Similarly, assume that workgroup 602 (workgroup #1) has been selected and that only the scanners have been designated by resource-information update processing in accordance with menu item 807 in FIG. 8B. Under this assumption, the scanners contained in the group obtained by selection of the workgroup 601 (workgroup #1) become the devices for which updating of information is desired. That is, resource-information update processing is executed only with regard to the three scanners 614 (scanner #1), 617 (scanner #2) and 618 (scanner #3).

A method of designating the type of peripheral for which information is to be obtained according to the third embodiment will be described with reference to the flowchart of FIG. 9. This method is such that when a workgroup, personal computers and peripheral devices have been designated, updating is performed only with regard to data limited to a device of a designated type contained in the selected group.

Figure 9:
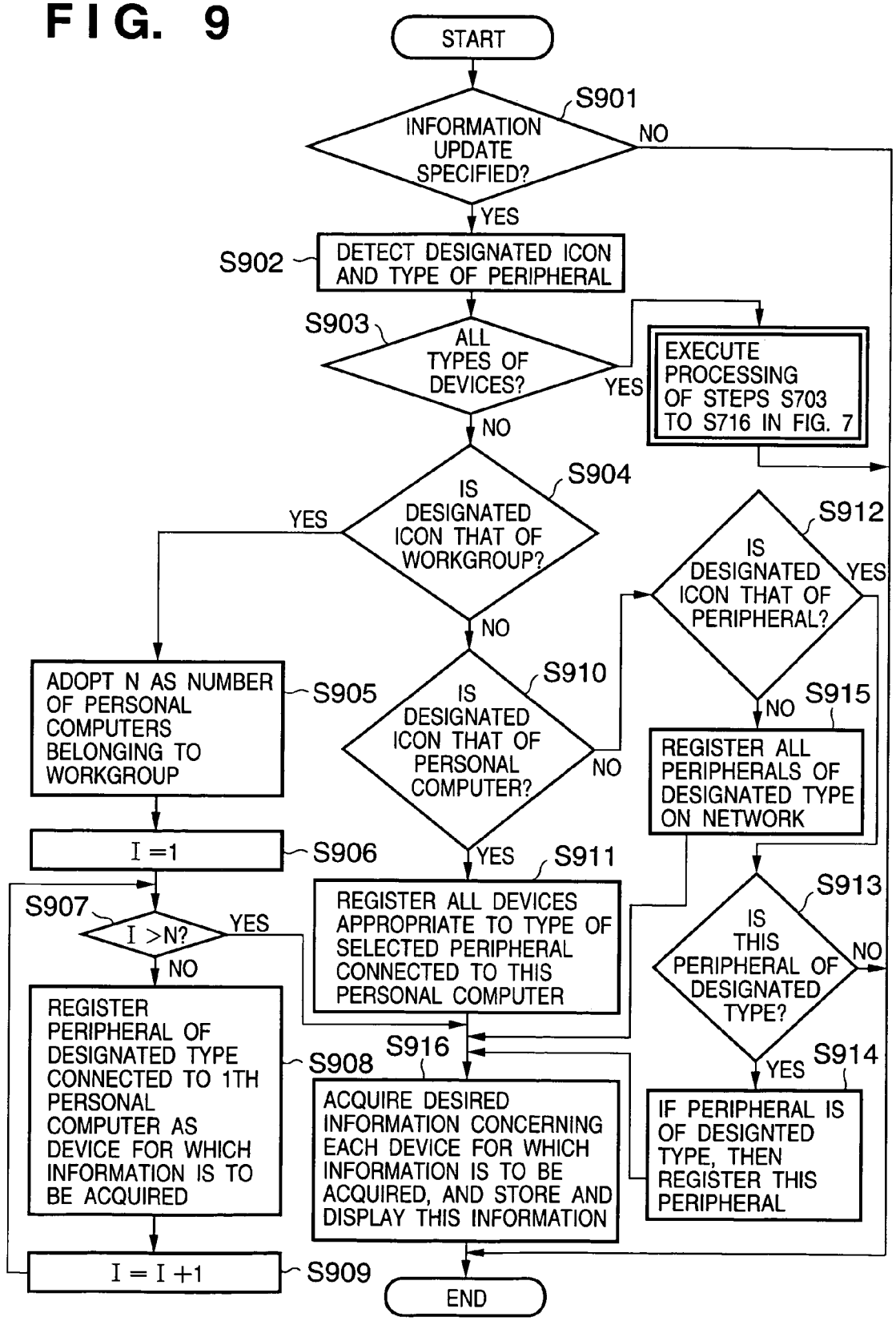
FIG. 9 is a flowchart useful in describing processing according to the third embodiment.

Step S901 in FIG. 9 calls for a decision as to whether or not information update processing has been specified. If such processing has been specified ("YES" at step S901), control proceeds to step S902. If such processing has not been specified ("NO" at step S901), the processing of this flowchart is exited.

At step S902, the personal computer, workgroup or peripheral designated is decided from the designated icon and the type of the designated device is decided from the designated menu item. This is followed by step S903, at which it is determined whether all of the types of devices have been designated by the menus.

If the devices of all types have been designated ("YES" at step S903), then processing similar to that of steps S703 to S718 in FIG. 7 is executed at the processing of FIG. 9 is exited.

If a device of a particular type has been designated and not devices of all types ("NO" at step S903), control proceeds to step S904.

It is determined at step S904 that whether the designated icon is that of a workgroup. If the designated icon is that of a workgroup ("YES" at step S904), control proceeds to step S905. Here the total number "N" of personal computers belonging to this workgroup is acquired. A counter variable I is initialized to 1 at step S906. The counter variable I and the number N of personal computers are compared at step S907. If I is equal to or less than N (I≦N), control proceeds to step S908.

At step S908, only information concerning the device of the designated type among the peripherals connected to the Ith personal computer is acquired and the device is registered as a device for which information is to be acquired. This is followed by step S909, at which the counter variable I is incremented to adopt the next personal computer as the device of interest. Control then returns to step S907 so that similar decision and registration processing is executed. When processing regarding all personal computers ends ("YES" at step S907), control proceeds to step S916.

If it is found at step S904 that the designated icon is not that of a workgroup ("NO" at step S904), then control proceeds to step S910 to determine whether the designated icon is that of a personal computer. If the designated icon is that of a personal computer ("YES" at step S910), control proceeds to step S911. Here only information concerning a device of the designated type among the peripheral devices connected to the personal computer is acquired and the device is registered as a device for which information is acquired. Control then proceeds to step S916.

If it is found at step S910 that the designated icon is not that of a personal computer ("NO" at step S910), control proceeds to step S912, at which it is determined whether the designated icon is that of a peripheral. If the answer is "YES", then control proceeds to step S913, where it is determined whether this peripheral matches the peripheral of the designated type. If the answer is "YES", then this peripheral is registered at step S914 as a device for which information is to be acquired.

If it is found at step S913 that the peripheral does not match that of the designated type ("NO" at step S913), then it is construed that there is no device for which information is to be acquired and processing is terminated.

If it is found at step S912 that the designated icon is not that of a peripheral ("NO" at step S912), then control proceeds to step S915, where all peripherals of the designated type among all peripherals on the network are adopted as target devices for which information is to be acquired. When the processing of steps S914 and S915 ends, control proceeds to step S916.

Step S916 is processing for the acquisition of information regarding all peripherals adopted thus far as target devices for which information is to be acquired, and for storing and displaying the acquired information as updated information.

Thus, in accordance with the third embodiment as described above, the type of peripheral for which information is desired to be acquired is designated, thus making it possible to execute information acquisition processing solely with regard to a peripheral of a type desired by the user. Updating of information can be performed in a shorter period of time and the load upon the network can be alleviated.

Other Embodiments

The present invention can be applied to a system constituted by a plurality of devices (e.g., a host computer, interface, reader, printer, etc.) or to an apparatus comprising a single device (e.g., a copier or facsimile machine, etc.).

Furthermore, it goes without saying that the object of the invention is attained also by supplying a storage medium (or recording medium) storing the program codes of the software for performing the functions of the foregoing embodiment to a system or an apparatus, reading the program codes with a computer (e.g., a CPU or MPU) of the system or apparatus from the storage medium, and then executing the program codes. In this case, the program codes read from the storage medium implement the novel functions of the embodiments and the storage medium storing the program codes constitutes the invention. Furthermore, besides the case where the aforesaid functions according to the embodiment are implemented by executing the program codes read by a computer, it goes without saying that the present invention covers a case where an operating system or the like running on the computer performs a part of or the entire process in accordance with the designation of program codes and implements the functions according to the embodiments.

It goes without saying that the present invention further covers a case where, after the program codes read from the storage medium are written in a function expansion card inserted into the computer or in a memory provided in a function expansion unit connected to the computer, a CPU or the like contained in the function expansion card or function expansion unit performs a part of or the entire process in accordance with the designation of program codes and implements the function of the above embodiments.

In a case where the present invention is applied to the above-mentioned storage medium, program code corresponding to the flowcharts (FIG. 5 and/or FIGS. 7, 9) described above would be stored on this storage medium.

Thus, in accordance with the data processing apparatus, etc., according to the present invention as described above, the updating of information limited to a device or group desired by the user can be performed in connection with processing for updating information concerning devices connected to a network. This makes it possible to alleviate the load on the network and to update the necessary information at high speed.

As many apparently widely different embodiments of the present invention can be made without departing from the spirit and scope thereof, it is to be understood that the invention is not limited to the specific embodiments thereof except as defined in the appended claims.

What is claimed is:

1. An information processing apparatus capable of communicating data with a plurality of kinds of devices, said information processing apparatus comprising:
   display means for displaying: (i) a first visual menu including a first list of commands, wherein each of the commands corresponds to a command for designating updating of resource information for a device or updating of status information for a device, and (ii) a second visual menu including a second list of commands, wherein each of the commands corresponds to one of a plurality of groups classified by each kind of the devices;

designation means for designating one of the commands in the first list included in the first visual menu, wherein the designated command corresponds to an instruction for the updating of the resource information or the updating of the status information and for designating one of the commands in the second list included in the second visual menu, wherein the designated command corresponds to an instruction for one group of the plurality of groups, wherein the first visual menu including the first list of commands and the second visual menu including the second list of commands are displayed as a hierarchical structure, and wherein the designated command in the first list and the designated command in the second list can be designated successively; and update means for updating: (i) in a case where a command for the updating of the resource information is designated among the first list of commands, resource information of devices included in the one group acquired by a communication result between the information processing apparatus and the devices included in the one group corresponding to the designated command in the second command list, and (ii) in a case where a command for the updating of the status information is designated among the first list of commands status information of the devices included in the one group acquired by a communication result between the information processing apparatus and the devices included in the one group corresponding to the designated command in the second command list.

2. The apparatus according to claim 1, further comprising selection means for selecting a computer, wherein said update means updates information stored in the information processing apparatus and indicating the peripheral devices which belong to the group corresponding to the visual object designated by said designation means and connect to the computer selected by said selection means, in a case where the statuses or the resources of the plurality of peripheral devices which belong to the group corresponding to the visual object designated by said designation means and connect to the computer selected by said selection means have been updated.

3. The apparatus according to claim 2, wherein said display means displays a selection window used for designating the visual object by said designation means in order to display the update of the statuses or the resources, in a case where the visual object is selected.

4. The apparatus according to claim 1, further comprising selection means for selecting a workgroup which includes a plurality of computers and peripheral devices, wherein said update means updates information stored in the information processing apparatus and indicating statuses or resources of the peripheral devices which belong to the group corresponding to the visual object designated by said designation means and belong to the workgroup selected by said selection means, in a case where the statuses or the resources of the peripheral devices which belong to the group corresponding to the visual object designated by said designation means and belong to the workgroup selected by said selection means have been updated.

5. The apparatus according to claim 1, wherein the group includes at least one of a group including a plurality of fax machines, a group including a plurality of scanners and a group including a plurality of printers.

6. An information processing method executed by an information processing apparatus capable of communicating data with a plurality of kinds of devices, said method comprising:

a display step of displaying: (i) a first visual menu including a first list of commands, wherein each of the commands corresponds to a command for designating updating of resource information for a device or updating of status information for a device and (ii) a second visual menu including a second list of commands, wherein each of the commands corresponds to one of a plurality of groups classified by each kind of the devices;

a designation step of designating one of the commands in the first list included in the first visual menu, wherein the designated command corresponds to an instruction for the updating of the resource information or the updating of the status information, and for designating one of the commands in the second list included in the second visual menu, wherein the designated command corresponds to an instruction for one group of the plurality of groups, wherein the first visual menu including the first list of commands and the second visual menu including the second list of commands are displayed as a hierarchical structure, and wherein the designated command in the first list and the designated command in the second list can be designated successively; and an update step of updating: (i) in a case where a command for the updating of the resource information is designated among the first list of commands, resource information of devices included in the one group acquired by a communication result between the information processing apparatus and the devices included in the one group corresponding to the designated command in the second command list, and (ii) in a case where a command for the updating of the status information is designated among the first list of commands, status information of the devices included in the one group acquired by a communication result between the information processing apparatus and the devices included in the one group corresponding to the designated command in the second command list.

7. The method according to claim 6, further comprising a selection step of selecting a computer, wherein said update step updates information stored in the information processing apparatus and indicating the peripheral devices which belong to the group corresponding to the visual object designated in said designation step and connect to the computer selected in said selection step, in a case where the statuses or the resources of the peripheral devices which belong to the group corresponding to the visual object designated in said designation step and connect to the computer selected in said selection step have been updated.

8. The method according to claim 7, wherein said display step displays a selection window used for designating the visual object in said designation step in order to display the update of the statuses or the resources, in a case where the visual object is selected.

9. The method according to claim 6, further comprising a selection step of selecting a workgroup which includes a plurality of computers and peripheral devices, wherein said update step updates information stored in the information processing apparatus and indicating statuses or resources of the peripheral devices which belong to the group corresponding to the visual object designated in said designation step and belong to the workgroup selected in said selection step, in a case where the statuses or the resources of the peripheral devices which belong to the group corresponding to the visual object designated in said designation step and belong to the workgroup selected in said selection step have been updated.

10. The method according to claim 6, wherein the group includes at least one of a group including a plurality of fax machines, a group including a plurality of scanners and a group including a plurality of printers.

* * * * *